United States Patent [19]

Hirayama et al.

[11] Patent Number: 4,571,677
[45] Date of Patent: Feb. 18, 1986

[54] TRACING SYSTEM

[75] Inventors: Mitsunori Hirayama; Kimio Yamanaka, both of Hyogo, Japan

[73] Assignee: Mitsubishi Denki Kabushiki Kaisha, Tokyo, Japan

[21] Appl. No.: 442,490

[22] Filed: Nov. 17, 1982

[30] Foreign Application Priority Data

Nov. 18, 1981 [JP] Japan .................. 56-186008

[51] Int. Cl.$^4$ ............................... G06F 11/00
[52] U.S. Cl. ........................... 364/200; 371/19
[58] Field of Search ... 364/200 MS File, 900 MS File, 364/580; 371/12, 16, 19, 17

[56] References Cited

U.S. PATENT DOCUMENTS

| 3,415,981 | 12/1968 | Smith et al. | 371/19 |
| 3,518,413 | 6/1970 | Holtey | 371/17 |
| 3,659,273 | 4/1972 | Knauft et al. | 371/17 |
| 3,763,474 | 10/1973 | Freeman et al. | 371/19 |
| 3,813,531 | 5/1974 | King et al. | 371/17 |
| 4,315,313 | 2/1982 | Armstrong et al. | 371/19 |
| 4,453,093 | 6/1984 | Boudreau | 371/16 |

FOREIGN PATENT DOCUMENTS 0763900 9/1980 U.S.S.R. ................ 371/19

OTHER PUBLICATIONS

IBM Tech. Discl. Bull., vol. 20, No. 4, Sep. 1977; "Program Debug Tool for Microprocessors", by E. Kellerman and L. J. Cesa, p. 1358.
Electrical Communication, vol. 54, No. 2, 1979, "Effective Software Debugging Using a Program Tracer", by J. M. Antoine et al., pp. 111-114.
IBM Tech. Discl. Bull., vol. 17, No. 11, Apr. 1975, "Processor Checking", by M. L. Carnes et al., pp. 3188-3189.
IBM Tech. Discl. Bull., vol. 16, No. 7, Dec. 1973, "Chocking of M-Program Instruction Sequencing", by D. C. Bossen et al., p. 2253.

Primary Examiner—James D. Thomas
Assistant Examiner—William G. Niessen
Attorney, Agent, or Firm—Bernard, Rothwell & Brown

[57] ABSTRACT

A tracing system for confirming an instruction which is executed by a central processing unit in accordance with an address of each instruction is provided with an AND gate for controlling such signal indicating coincidence between the address and trace address by utilizing a valid signal indicating that the contents of a memory address register of the central processing unit are true addresses of the instruction to be executed in the next stage.

2 Claims, 4 Drawing Figures

TRACING SYSTEM

BACKGROUND OF THE INVENTION

1. Field of the Invention

The present invention relates to a system for tracing a program by detecting coincidence between an address which has previously been set and the execution address in its central processing unit (CPU).

2. Description of the Prior Art

First of all, a conventional tracing system, for example, the one which has been utilized for debugging a computer program will be described hereinbelow.

In FIG. 1, reference numeral 1 designates a CPU, and numeral 2 designates a usual tracing system for checking whether the execution address in the CPU 1 coincides with a preset address or not. The CPU 1 involves a memory address register 3, the contents of which are outputted to the tracing system 2 as the next address signal. The tracing system 2 comprises a trace address register 4, a comparator 5, and a trace controller 6. The trace address register 4 has the function to store the address to be traced, and the contents thereof are supplied to the comparator 5 as the trace address signal. The comparator 5 compares the next address (NEXT AD) signal supplied from the memory address register 3 of the CPU 1 with the trace address signal, and an equivalent signal indicating the detection of coincidence is outputted in the case where both the next address signal and the trace address signal coincide with each other. The resulting equivalent signal is inputted to the trace controller 6. When the equivalent signal is received, the trace controller 6 effects at least one operation which has previously been determined. Such operations may be indication of coincidence between the execution address and the trace address, setting the next address required for tracing into the trace address register 4, and stoppage of operation of the CPU.

FIG. 2 is a flow chart in respect of a part of program involved in the CPU illustrating such sequence in which addresses set in the memory address register 3 are successively updated in accordance with orders such as 99, 100, 101, . . . , and 104, whereby prescribed contents, i.e., instructions M0, M1, M2, M3 and M4 are successively read out from a memory (not shown) in response to these addresses. In this case, it is assumed that a program is branched so as to execute the contents corresponding to the address 103 where the instruction M1 read out in the address 100 is smaller than the contents Acc of an accumulator (not shown) of the CPU, namely such condition Acc>M1 is satisfied. Accordingly, even if the program has been branched by means of execution of the instruction M1 in the case where the contents of the trace address register 4 are address 101, there is a case where coincidence between the next address signal and the trace address signal is detected by the comparator 5 to output equivalent signal, whilst the program executes the contents corresponding to address 103 in the case where the contents of the memory address register 3 come to be address 101. Thus, in such conventional tracing system, there is such a case where such malfunction that coincident signal is outputted even if the trace address does not coincide with execution address of the CPU dependent on the form of the program performed.

SUMMARY OF THE INVENTION

According to the present invention, there is provided a tracing system comprising a trace address register for holding trace address; a comparator for comparing the aforesaid trace address with address supplied from the memory address register in which execution address in the CPU is caused to output a coincident signal when both the trace address and the memory address coincide with each other; and an AND circuit utilizing the aforesaid coincident signal as well as a pulse-like valid signal which is outputted from an arithmetic and logic unit in the case where the address held in the memory address register is a correct address corresponding to a program which is succeedingly to be executed as the input signals; output of the aforesaid AND circuit being adapted to be utilized as a coincidence detecting signal for tracing.

The tracing system according to the present invention has an advantage in providing a significant signal indicating that the address in the CPU is the one correspondingly correctly to the prescribed program and output of the comparator, whereby execution process of the program in the CPU can be reliably determined.

DESCRIPTION OF A PREFERRED EMBODIMENT

A preferred embodiment of the present invention will be described hereinbelow with reference to the accompanying drawings.

Figure 3:
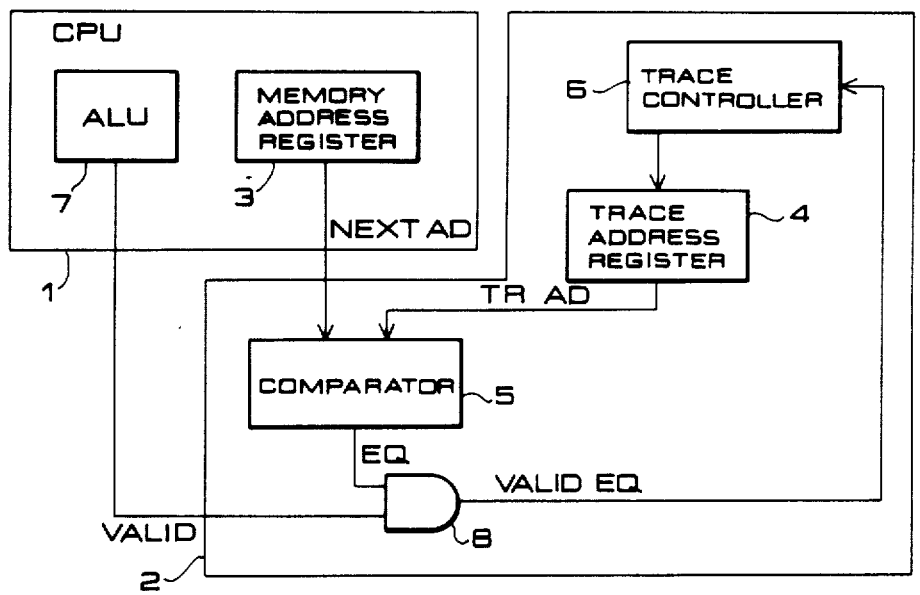
FIG. 3 is a block diagram illustrating a tracing system according to an embodiment of the present invention and the CPU which is traced thereby.

In FIG. 3, reference numeral 1 designates a central processing unit (CPU), and 2 a tracing system, respectively. The CPU supplies next address signal derived from a memory address register 3 as well as VALID signal derived from an arithmetic and logic circuit (ALU) 7 having a usual construction to the tracing system 2.

Figure 1:
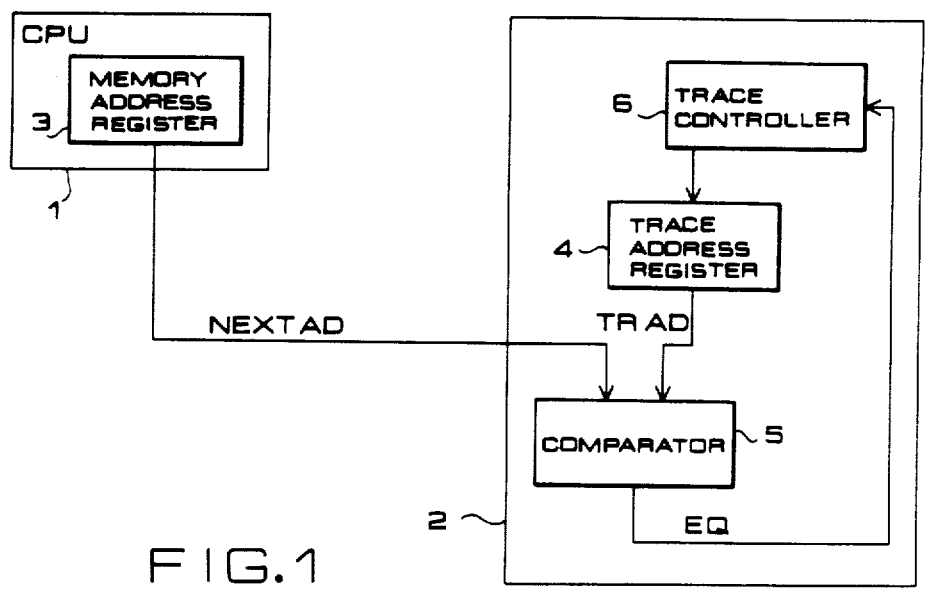
FIG. 1 is a block diagram illustrating a conventional tracing system and the CPU which is traced thereby.

The tracing system 2 involves an AND gate 8 to which equivalent signal (EQ) from a comparator 5 and valid signal from the ALU 7 are supplied, in addition to the trace address register 4, the comparator 5 and the trace controller 6 illustrated in FIG. 1. In this situation, output signal (VALID EQ) of the AND gate 8 is supplied similarly to the equivalent signal as in the conventional tracing system illustrated in FIG. 1 to the trace controller 6. Functions of the trace address register 4, the comparator 5 and the trace controller 6 are substantially same with those illustrated in FIG. 1, respectively, and accordingly the detailed description thereof will be omitted.

Figure 4:
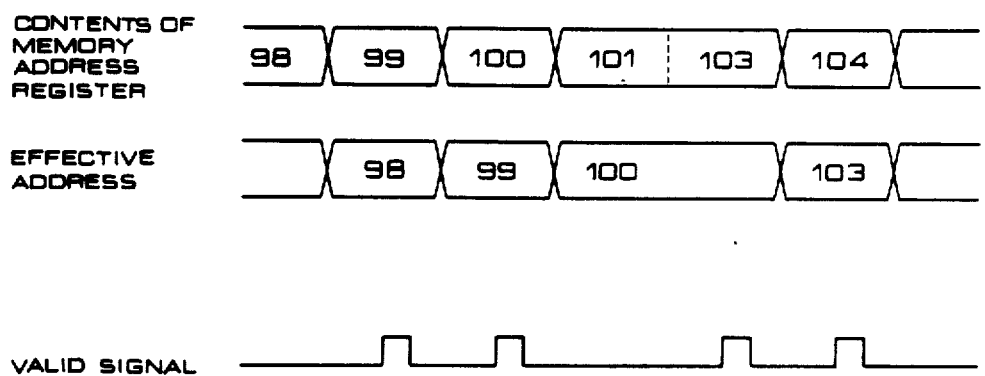
FIG. 4 is a time chart showing operation of the CPU in FIG. 3.
Figure 2:
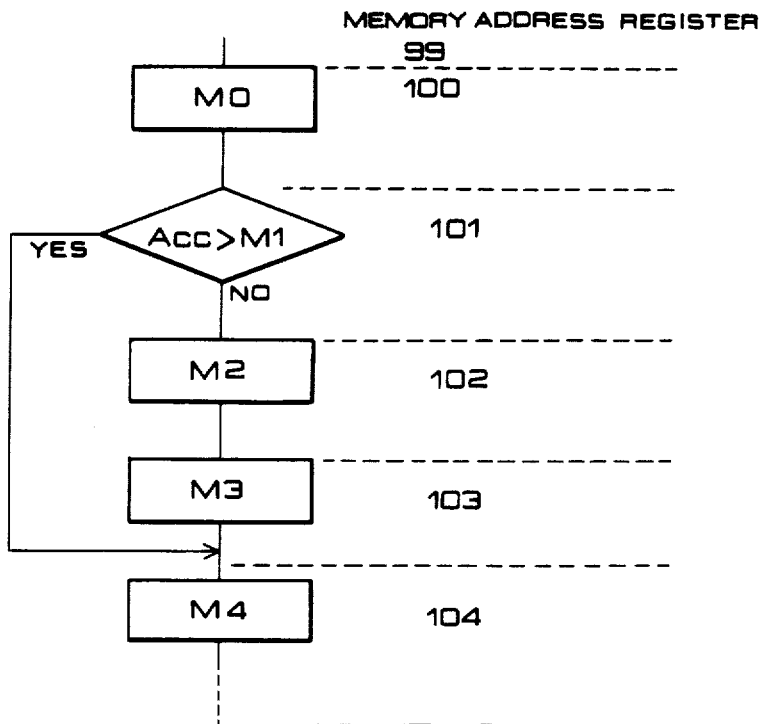
FIG. 2 is a flow chart illustrating a part of a program executed by means of the CPU of FIG. 1.

FIG. 4 is a time chart illustration a relationship between contents of the memory address register, the execution address, and the valid signal in the case where the CPU 1 of FIG. 3 executes the program illustrated in FIG. 2. The valid signal is outputted from the ALU 7 in the case where the address preset in the memory address register 3 is a correct address to be executed in the next stage. Now, it is assumed that execution address in the CPU 1 is the one designated by numeral 98, address 99 is correct address to be executed in the next stage if contents in the memory address register 3 are the address 99. As a result, the ALU 7 sends valid signal to the AND gate 8. In this case, since contents of the trace address register 4 are also address 99, the next address signal is equal to trace address signal, and the comparator 5 sends equivalent signal to the AND gate. As a consequence, the AND gate 8 outputs valid equivalent signal. At the time when the resulting valid equivalent signal is received by the trace controller 6, the same performs prescribed operations including indication of the coincidence between execution address and trace address. Then, when the execution address reaches the one designated by numeral 100, the next address signal indicates address 101 equal to trace address signal being output of the trace address register 4, whereby valid equivalent signal is outputted from the AND gate 8. In this case, however, the ALU 7 executes branch instruction in accordance with the program illustrated in FIG. 2, and accordingly the ALU 7 does not output a valid signal. Such occasion where the next valid equivalent signal is outputted is the case in which the CPU executes the instruction corresponding to address 100 and the ALU 7 outputs a valid signal, and more specifically the case where such condition Acc>M1 is not satisfied.

As described above, the tracing system according to the present invention has a function to detect the fact that a coincident condition between trace address and execution address is satisfied, and the CPU outputs valid signal. Accordingly, the tracing system of the invention has the advantage that execution process of a program can reliably be traced irrespective of the form of the program in the CPU. Therefore, such tracing system is useful for debugging or monitoring the program.

What is claimed is:

1. A tracing system wherein a central processing unit compares contents of a memory address register holding an address corresponding to the instruction to be executed in the next execution stage with a trace address which has previously been set to detect coincidence of the trace address by means of the coincidence of said contents of the memory address register and said trace address, said system comprising a trace register holding said trace address which has previously been set; a comparator connected to said trace address register and to said memory address register for comparing the trace address set in said trace address register with the address set in said memory address register to output a coincident signal in the case where said trace address coincides with said memory address; and an AND circuit for receiving the coincident signal derived from said comparator and a valid signal sent from an arithmetic and logic circuit of said central processing unit in the case when the address corresponding to the instruction to be executed in the next execution stage in said central processing unit is held in said memory address register.

2. A tracing system as claimed in claim 1, which further comprises a trace controller means for presetting the next trace address in said trace address register at the time when output signal of said AND circuit is received.

* * * * *